US009967223B2

(12) United States Patent
Zhou et al.

(10) Patent No.: US 9,967,223 B2
(45) Date of Patent: May 8, 2018

(54) SYSTEM FOR PUSH SERVICE NOTIFICATION BASED ON USER HISTORY

(71) Applicant: SAP SE, Walldorf (DE)

(72) Inventors: Ke Guo Zhou, Shanghai (CN); Yu Jun Peng, Shanghai (CN)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 14/135,481

(22) Filed: Dec. 19, 2013

(65) Prior Publication Data

US 2015/0180815 A1 Jun. 25, 2015

(51) Int. Cl.
*H04L 12/58* (2006.01)
*H04L 29/08* (2006.01)

(52) U.S. Cl.
CPC .............. *H04L 51/24* (2013.01); *H04L 51/14* (2013.01); *H04L 67/26* (2013.01); *H04L 67/325* (2013.01)

(58) Field of Classification Search
CPC ...................................... H04L 51/24
USPC ......................................... 709/206
See application file for complete search history.

(56) References Cited

U.S. PATENT DOCUMENTS

2011/0119363 A1* 5/2011 Hua ................. H04L 29/12188
709/223
2013/0197991 A1* 8/2013 Basu et al. ................. 705/14.39
2014/0365523 A1* 12/2014 Wagner et al. .............. 707/770

* cited by examiner

*Primary Examiner* — VIvek Srivastava
*Assistant Examiner* — Sibte Bukhari
(74) *Attorney, Agent, or Firm* — Jones Day

(57) ABSTRACT

Disclosed herein is a framework for pushing service notifications to users via selected channels that are chosen based on user history. In accordance with one aspect, the framework determines if a notification is to be sent to a particular user. The framework may further determine if the notification requires an action. If the notification requires no action, the framework may choose, from multiple channels, a channel with lowest receive time duration. The framework may then send the notification via the chosen channel.

17 Claims, 8 Drawing Sheets

SYSTEM FOR PUSH SERVICE NOTIFICATION BASED ON USER HISTORY

TECHNICAL FIELD

The present disclosure relates generally to providing push service notifications to users.

BACKGROUND

Notifications may be sent to users via numerous systems and devices. Such notifications include various messages (e.g., email, SMS, text, etc.), data, and the like. The notifications are considered "pushed", since they are sent without initiation or request from a user.

The notifications may be sent from a central location. The central location or center may send the notifications via multiple channels. In many cases, there may be redundant notifications sent to a user, and/or there may be notifications that are needed. In certain instances, there may be notifications that may require an action by the user. It is desirable to efficiently send notifications to users.

SUMMARY

Disclosed herein is a framework for pushing service notifications to users via selected channels that are chosen based on user history. In accordance with one aspect, the framework determines if a notification is to be sent to a particular user. The framework may further determine if the notification requires an action. If the notification requires no action, the framework may choose, from multiple channels, a channel with lowest receive time duration. The framework may then send the notification via the chosen channel.

In accordance with another aspect, the framework initiates a push notification to a particular user. The framework may determine if the push notification is for information only. If the push notification is for information only, the framework chooses a channel based on lowest receive time duration as determined by prior user history over multiple channels. The notification may then be sent via the chosen channel.

In accordance with yet another aspect, a push center is provided. The push center may send service notifications to multiple users. The push center may be configured to connect to multiple channels. The push center may determine which channels to send the service notifications based on trend analysis regarding user and channel history.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for providing push service notification based on user history. Examples of users include individuals, business or corporate entities, etc. Channels used to provide notifications are chosen based on the efficiency, where efficiency of channels is determined based on user history and trend analysis of channels to send notifications to users.

Figure 1:
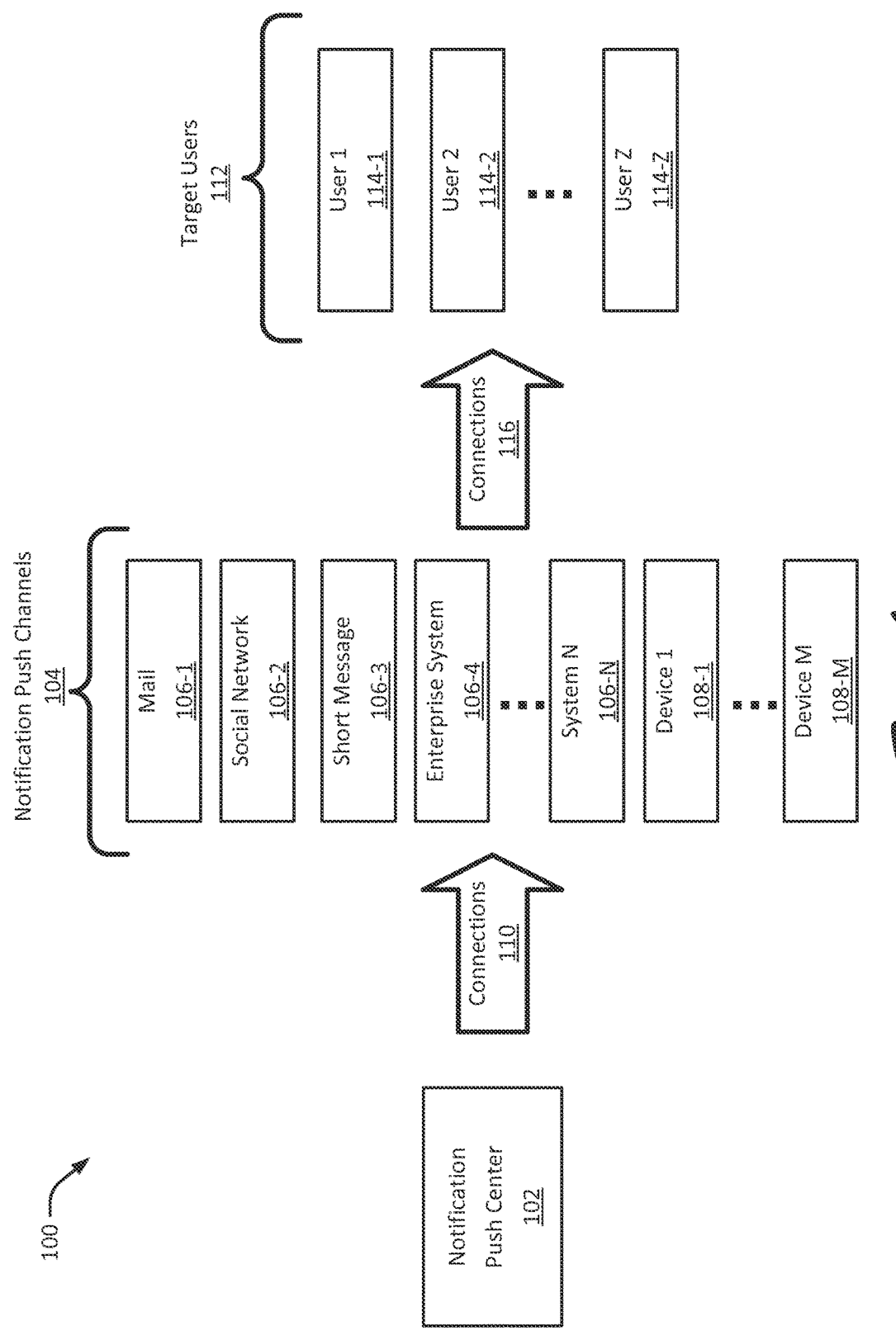
FIG. 1 illustrates an exemplary system used in accordance with the technology described herein.

FIG. 1 shows an example system 100 that may be used to provide push notifications to users. System 100 includes a central notification push center 102. Multiple notification push channels 104 may be used to provide the notifications. Notification push channels 104 may include various subsystems 106, such as a mail 106-1, social network 106-2, short message (i.e., SMS) 106-3, enterprise 106-4 up to and including system N 106-N. Notification push channels 104 may also include devices, such as device 1 108-1 to device M 108-M. Devices 108 may include a mobile phone, personal computer, tablet, etc. Individual multiple connections may be used by notification push center 102 to directly connect to notification push channels 104. The individual multiple connections are represented by connections 110.

Various target users 112 receiving notifications are shown in this example as user 1 114-1, user 2 114-2, up to user Z 114-Z. The target users 112 may receive notifications, by directly connecting via individual multiple connections. The individual multiple connections are represented by connections 116.

If the push center is to send a notification using all the channels to all the users, the number of push times or count of number of sent notifications is represented as follows:

$$\text{Push times} = \text{number of push channels} * \text{number of target users} \quad (1)$$

In this example, the number of push times, will be:

$$\text{Push times} = [N(\text{i.e., number of systems}) + M(\text{i.e., number of devices})] * Z(\text{i.e., number of users})$$

It is to be understood that not all users will be active, or receive notifications, on all the channels that are provided. For example, users may be active only on certain systems or access only particular devices.

Figure 2:
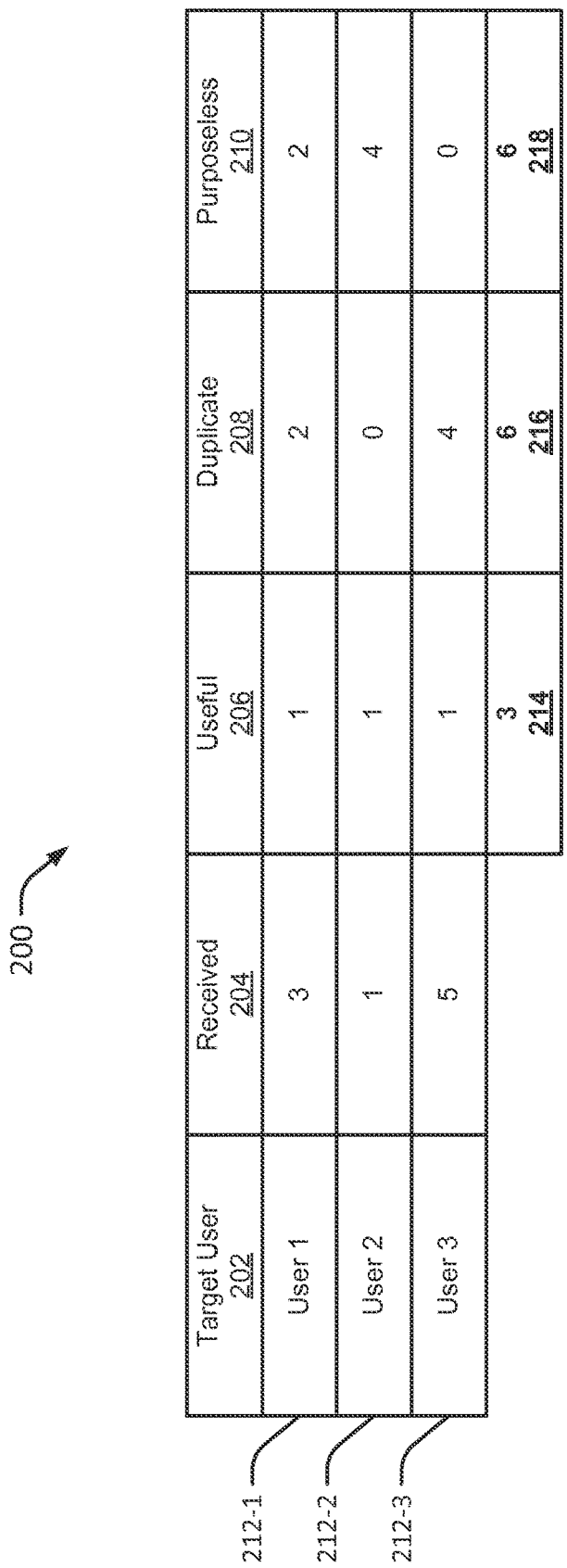
FIG. 2 illustrates an exemplary table used in accordance with the technology described herein.

FIG. 2 illustrates an example of different users and their access to different channels, receipt of notifications and effect of the notifications. This example is illustrated in table 200. In this example, there are three (3) users, and the central push center uses five (5) push channels. Therefore, using equation (1) above, the push times equals 3*5 or 15.

Table 200 includes column heading/categories of target user 202, which identifies a user; received 204, which are actual received notification; useful 206, which are number of notifications that are useful to the user; duplicate 208, which are the number of redundant notifications; and purposeless 210, which are the number of channels that are not used.

In this example, there are three target users 212 represented by user 1, user 2, and user 3. Three associated entries 212-1, 212-2, and 212-3 respectively represent user 1, user 2, and user 3.

As an example, user 1 is active on three channels; therefore, user 1 receives three notifications, represented under the received 204 heading. However, only one notification is useful, as represented under useful 206 heading. Of the three notifications, two notifications are determined to be redundant, as represented under the duplicate 208 heading. Because user 1 only is active on only three channels of the five channels, or receives notifications on three of the five available channels from the push center, two of the five channels are of no purpose to user 1, as represented by purposeless heading 210.

Continuing with the example, user 2 is active on only one channel. User 2 receives only one notification. User 2 has no duplicate channels. User 2 has no need for four of the available five channels, as represented by purposeless heading 210.

User 3 is active on all five channels. User 3 receives five notifications. Only one notification is useful to user 3. Four notifications are duplicate or redundant. Since all five channels are used, there are no purposeless channels.

In this example scenario, for the three users, there are 15 notifications sent. Three notifications are determined to be useful, as represented by the total value of three (3) in box 214. Six notifications are determined to be duplicate, as represented by the total value of six (6) in box 216. Six channels are determined to be purposeless, as represented by the total value of six (6) in box 218. Therefore, there are 12 notifications that are not needed, because of duplication or no access/use (i.e., purposeless) to particular channels. Considering there are 15 notifications, the 12 not needed notifications are significant. As the number of users and channels increase, the number of redundant/not needed notifications is expected to increase. Therefore, a goal is to provide for a more efficient system and process for push service notifications.

Figure 3:
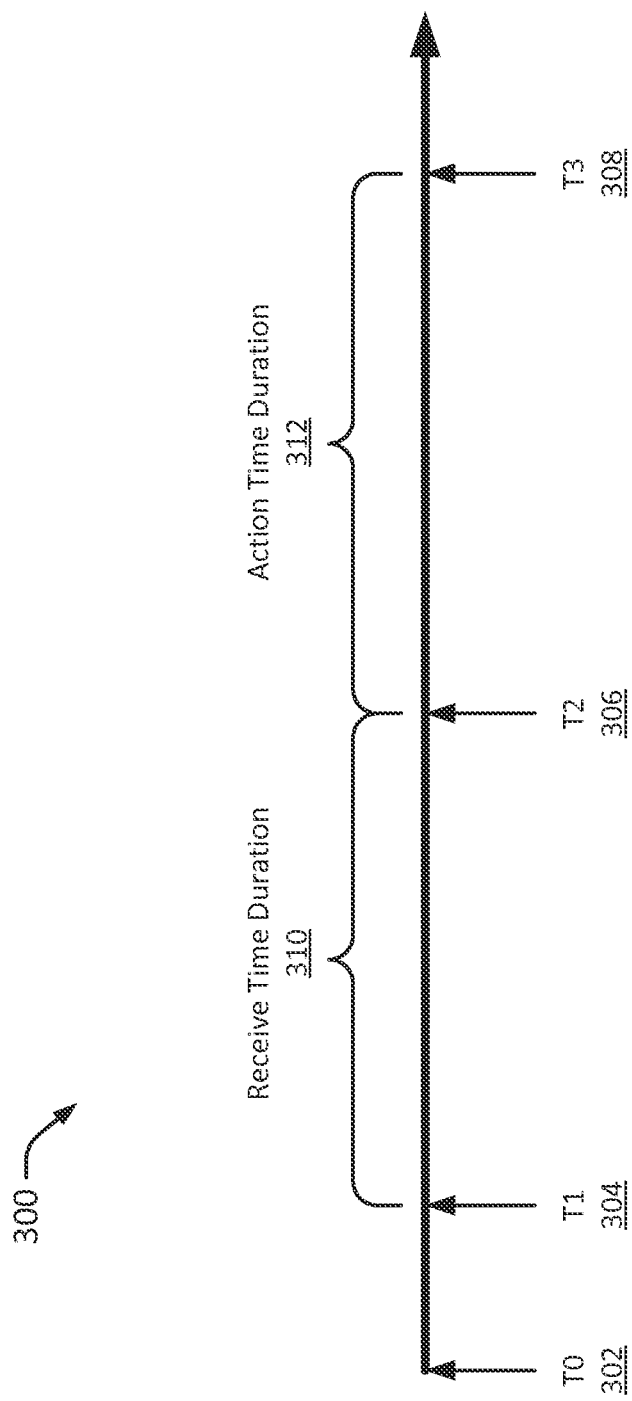
FIG. 3 illustrates an exemplary timeline used in accordance with the technology described herein.

FIG. 3 illustrates an exemplary timeline 300 for implementing, at least in part, the technology described herein. The timeline 300 includes various relative time points T0 302, which may be considered zero time; T1 304; T2 306; and T3 308.

Receive Time Duration (RTD) 310 is defined as the time duration for receiving the push notification after the push notification has been sent from the push center 102, which is the value T2 306 minus T1 304. In this example, T1 304 is the time that notification push center 102 sends the notification, and T2 306 is the time the user receives the notification and a confirmed read receipt is sent back to the push center 102. When a user reads the notification, the read receipt may be sent back to the push center to confirm that the notification is received by the user.

Action Time Duration (ATD) 312 is defined as the time duration for a user to take action after notification is received, which is the value T3 308 minus T2 306. In this example, T3 308 is the time at which the user takes action on the system regarding the received notification. The action is engaged with the business context in the push notification. Examples of the actions can include: reply the notification, send command, directly take action in the system (e.g., system 100).

Actions may be logged into the push center with user ID (name) and the related notifications. The push center or notification push center 102 may record all RTD and ATD values for all users. Particular examples of such records are discussed below. Such records may be used to determine trend analysis and efficiently determine channels to use in providing push notifications.

Figure 4:
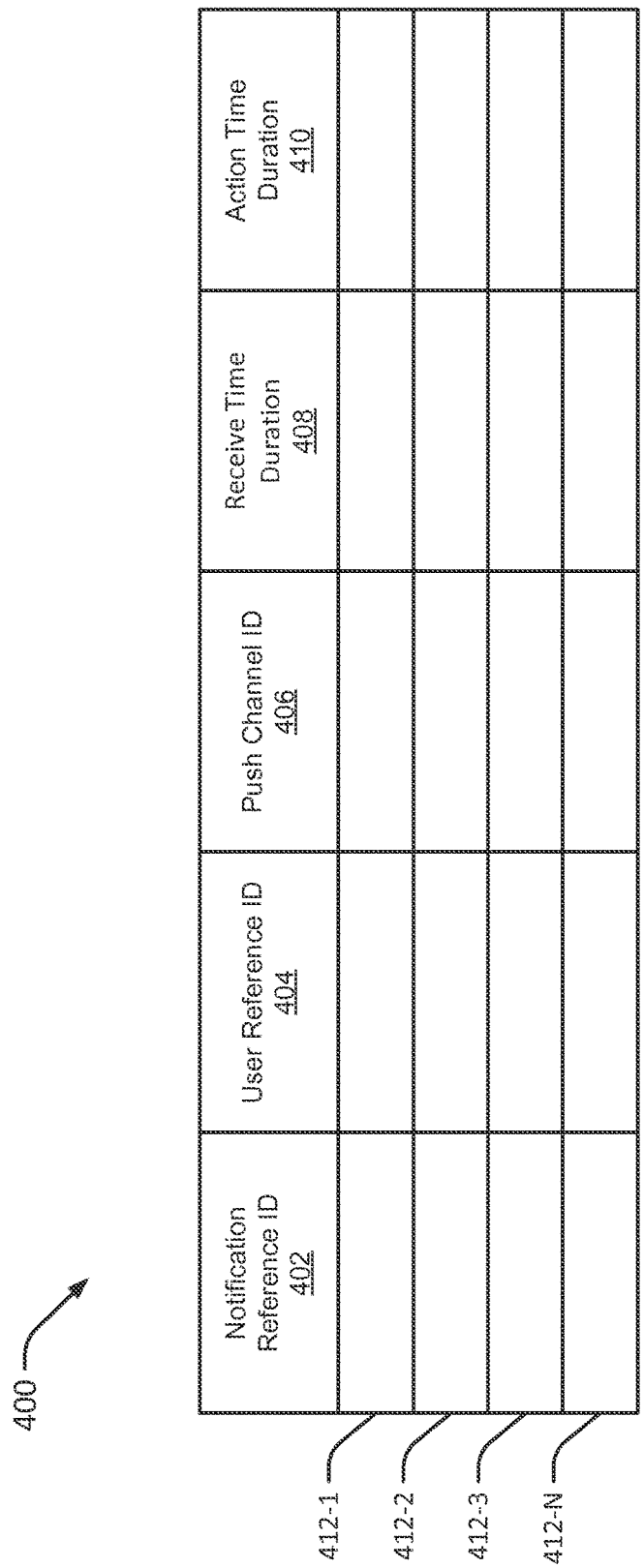
FIG. 4 illustrates another exemplary table used in accordance with the technology described herein.

FIG. 4 illustrates an exemplary table 400 for implementing, at least in part, the technology described herein. Table 400 may be considered as a log entry record of notifications. In particular, table 400 includes the following headings: notification reference ID 402 identifying a particular push notification; user reference ID 404 identifying a user; push channel ID 406 identifying a channel; receive time duration 408 providing a RTD value; and action time duration 410 providing an ATD value. Values are recorded for a number of entries 412-1 to 412-N.

Figure 5:
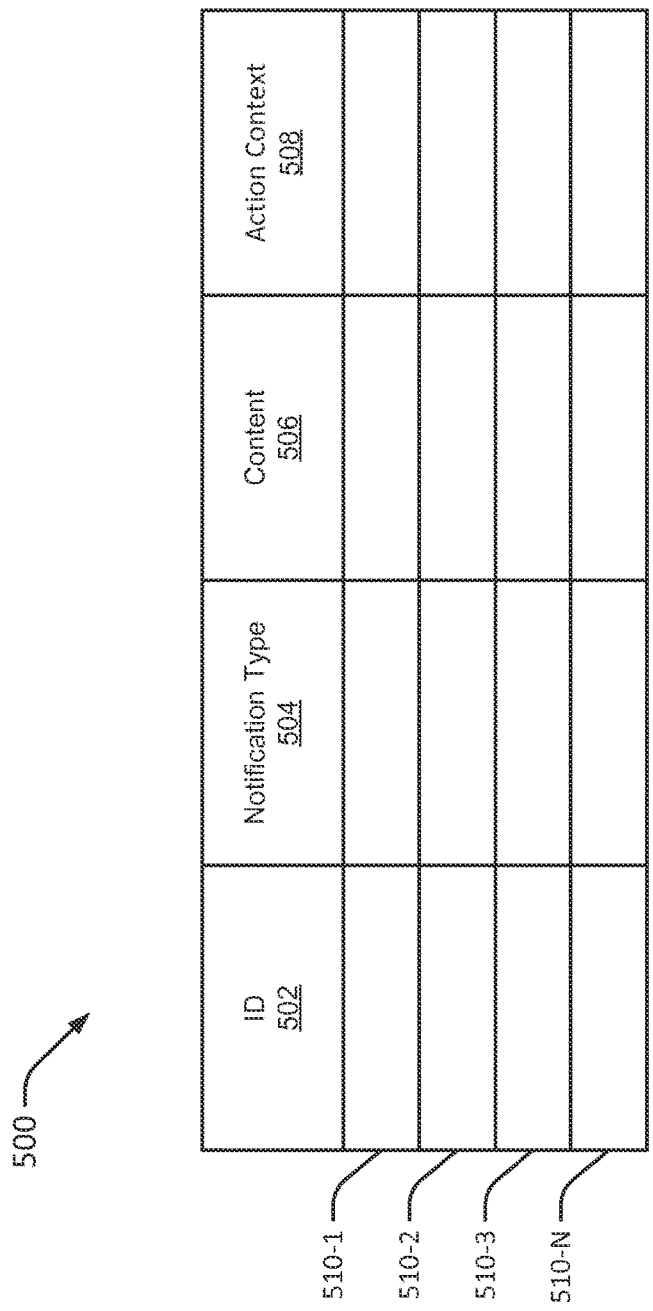
FIG. 5 illustrates another exemplary table used in accordance with the technology described herein.

FIG. 5 illustrates another exemplary table 500 for implementing, at least in part, the technology described herein. Table 500 may be considered as a listing of notifications. In particular, table 500 includes the following headings: ID 502 identifying a particular notification; notification type 504 identifying the type of notification (e.g., action to be taken, no action/informational, etc.); content 506 identifying content in notification (e.g., general information regarding notification content); and action context 508, which may be information regarding system, subsystem and channels. Values are recorded for a number of notification entries 510-1 to 510-N.

Figure 6:
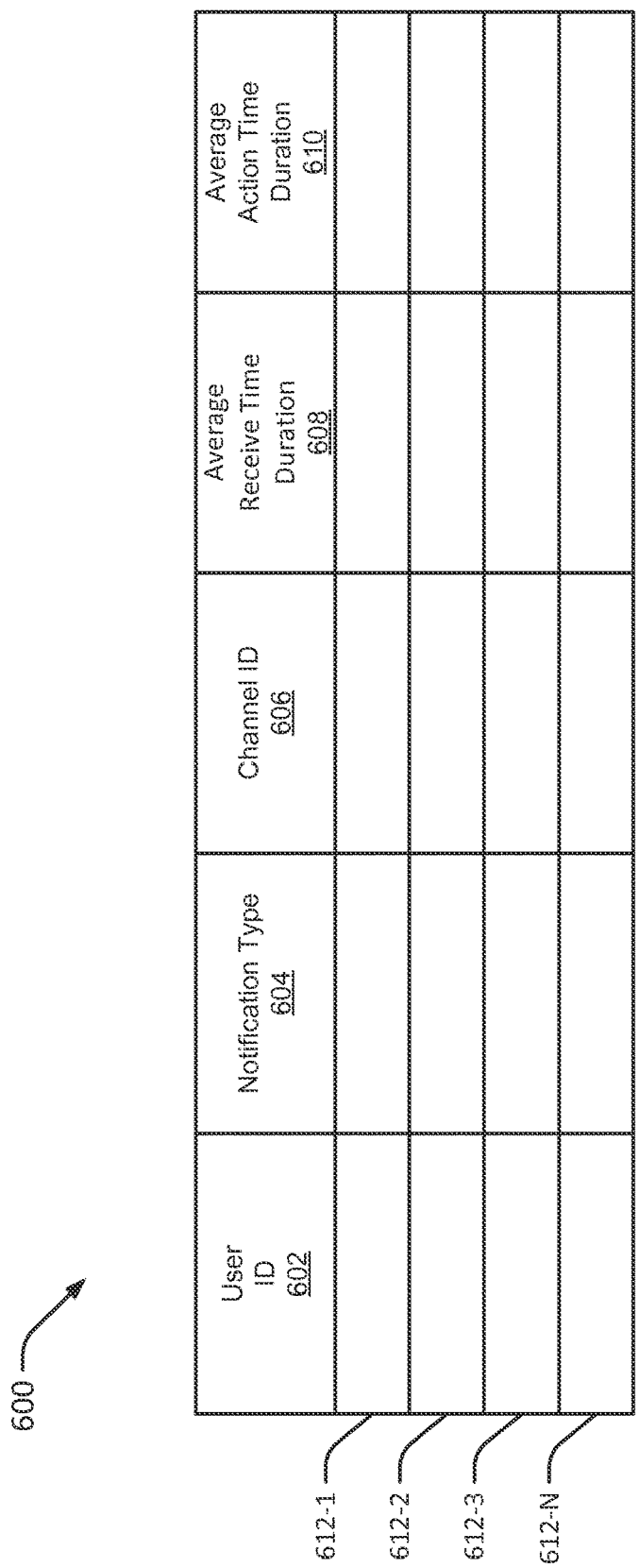
FIG. 6 illustrates another exemplary table used in accordance with the technology described herein.

FIG. 6 illustrates an exemplary table 600 for implementing, at least in part, the technology described herein. Table 600 may be considered as a record or listing for trend analysis. In particular, table 600 includes the following headings: user ID 602 identifying a user; notification type 604 identifying the type of notification (e.g., action to be taken, no action/informational, etc.); channel ID 606 identifying a channel; average receive time duration 608, and average action time duration 610. Values are recorded for a number of entries 612-1 to 612-N. To analyze the RTD and ATD for each user, notification type and channel, table 600 may be used to timely update the average RTD and ATD for each combination of user, notification type, and channel. For example, for a certain user and a specific channel, notifications determined as the same notification type may be calculated for average RTD and ATD per the following:

$$\text{Average RTD} = \text{sum(RTD of all notification)}/\text{notification count} \quad (2)$$

$$\text{Average ATD} = \text{sum(ATD of all notification)}/\text{notification count} \quad (3)$$

Figure 7:
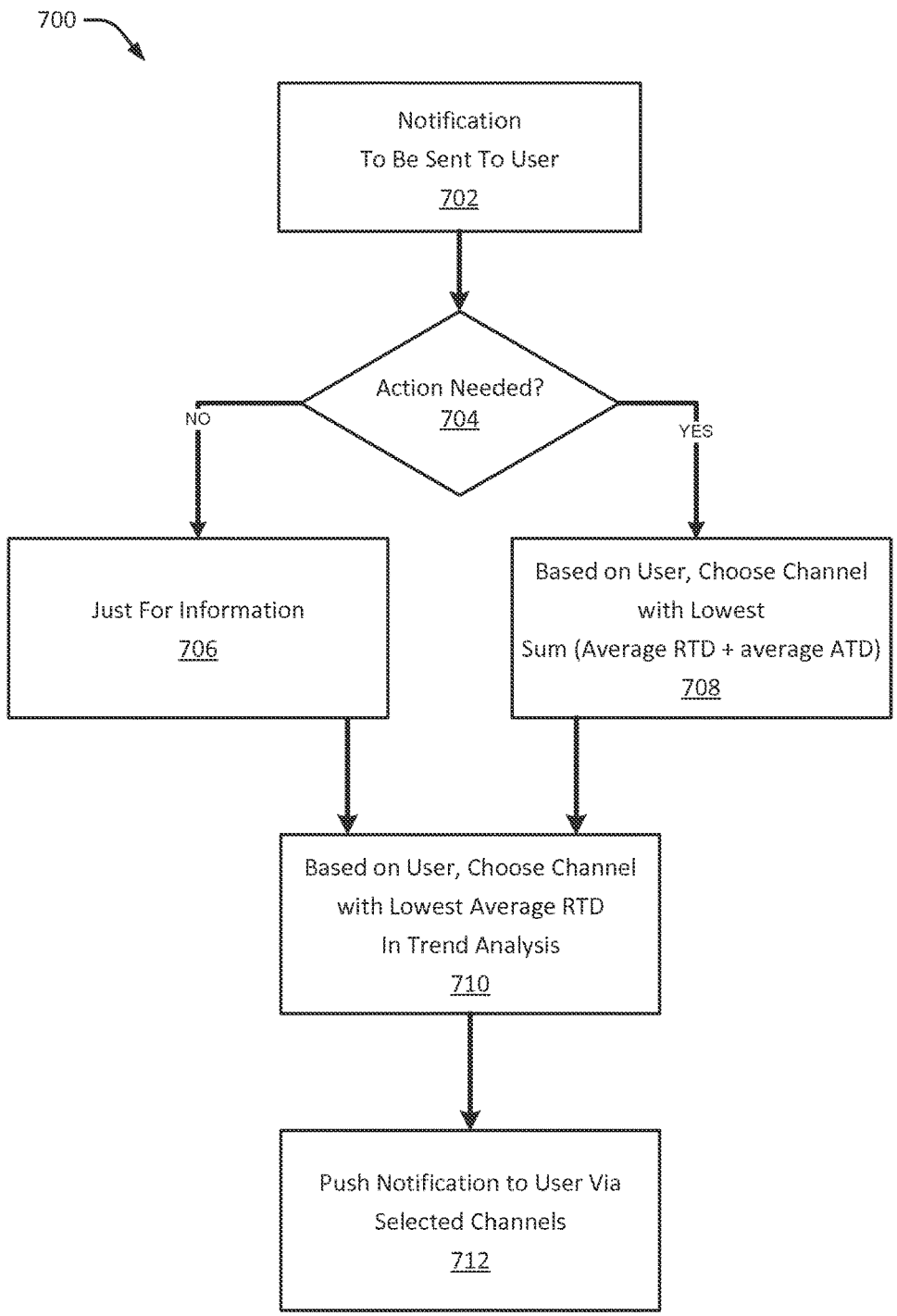
FIG. 7 illustrates an exemplary process used in accordance with the technology described herein.

FIG. 7 illustrates an exemplary process 700 for implementing, at least in part, the technology described herein. In particular, process 700 depicts a flow to determine channels for push notification messages. The process 700 may be performed by a computing device or devices. An example architecture of such a computer device is described below with reference to FIG. 8. In this particular example, the process 700 describes that certain acts may be performed at or by a user or a system.

At 702, a notification is to be sent to a user. As discussed above, a push center 102 through multiple channels 104 may send or push the notification to the user.

At 704, a determination is made if the pushed notification requires an action by the user. If no action is needed, following the "NO" branch of 704, the step of 706 is performed. At 706, the notification is determined to be for "information only" to the user.

If action is needed, following the "YES" branch of 704, the step of 708 is performed. At 708, based on the user, a channel with the lowest sum of the "average RTD" and the "average ATD" is chosen.

At 710, based on the user, the channel with the lowest average RTD is chosen based on trend analysis (i.e., records) as discussed above. This is particularly true if the notification is just for information only (i.e., following 706).

At 712, the notification is sent/pushed to the user via the selected channel or channels as determined at 708 and 710.

Figure 8:
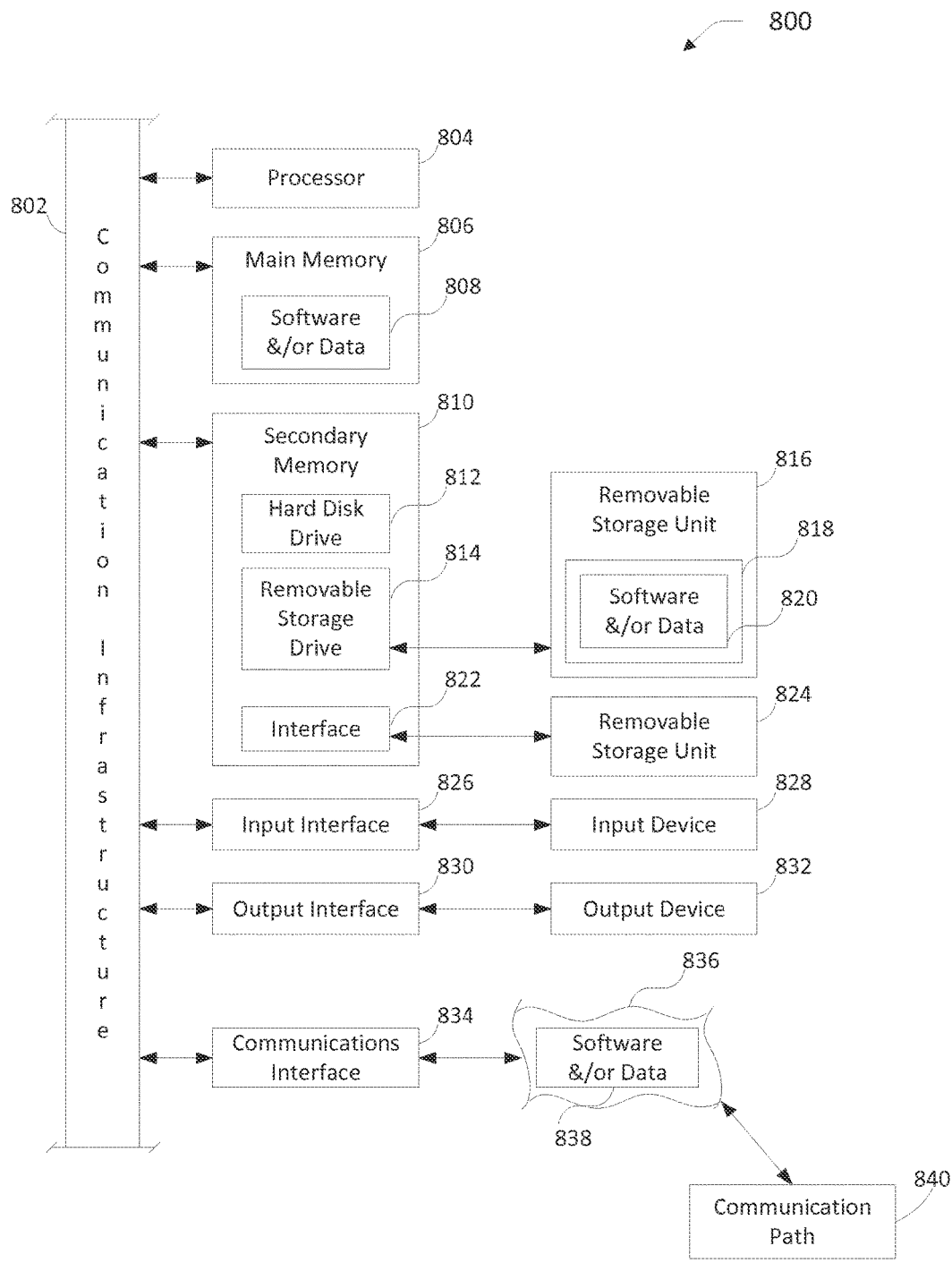
FIG. 8 illustrates an exemplary computing system to implement in accordance with the technologies described herein.

FIG. 8 illustrates an exemplary system 800 that may implement, at least in part, the technologies described herein. The computer system 800 includes one or more processors, such as processor 804. Processor 804 can be a special-purpose processor or a general-purpose processor. Processor 804 is connected to a communication infrastructure 802 (for example, a bus or a network). Depending upon the context, the computer system 800 may also be called a client device.

Computer system 800 also includes a main memory 806, preferably Random Access Memory (RAM), containing possibly inter alia computer software and/or data 808.

Computer system 800 may also include a secondary memory 810. Secondary memory 810 may include, for example, a hard disk drive 812, a removable storage drive 814, a memory stick, etc. A removable storage drive 814 may include a floppy disk drive, a magnetic tape drive, an optical disk drive, a flash memory, or the like. A removable storage drive 814 reads from and/or writes to a removable storage unit 816 in a well-known manner. A removable storage unit 816 may include a floppy disk, a magnetic tape, an optical disk, etc. which is read by and written to by removable storage drive 814. As will be appreciated by persons skilled in the relevant art(s) removable storage unit 816 includes a computer usable storage medium 818 having stored therein possibly inter alia computer software and/or data 820.

In alternative implementations, secondary memory 810 may include other similar means for allowing computer programs or other instructions to be loaded into computer system 800. Such means may include, for example, a removable storage unit 824 and an interface 822. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 824 and interfaces 822 which allow software and data to be transferred from the removable storage unit 824 to computer system 800.

Computer system 800 may also include an input interface 826 and a range of input devices 828 such as, possibly inter alia, a keyboard, a mouse, etc.

Computer system 800 may also include an output interface 830 and a range of output devices 832 such as, possibly inter alia, a display, one or more speakers, etc.

Computer system 800 may also include a communications interface 834. Communications interface 834 allows software and/or data 838 to be transferred between computer system 800 and external devices.

Communications interface 834 may include a modem, a network interface (such as an Ethernet card), a communications port, a Personal Computer Memory Card International Association (PCMCIA) slot and card, or the like. Software and/or data 838 transferred via communications interface 834 are in the form of signals 836 which may be electronic, electromagnetic, optical, or other signals capable of being received by communications interface 834. These signals 836 are provided to communications interface 834 via a communications path 840. Communications path 840 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 816, removable storage unit 824, and a hard disk installed in hard disk drive 812. Computer program medium and computer usable medium can also refer to memories, such as main memory 806 and secondary memory 810, which can be memory semiconductors (e.g. Dynamic Random Access Memory (DRAM) elements, etc.). These computer program products are means for providing software to computer system 800.

Computer programs (also called computer control logic) are stored in main memory 806 and/or secondary memory 810. Such computer programs, when executed, enable computer system 800 to implement the present technology described herein. In particular, the computer programs, when executed, enable processor 804 to implement the processes of aspects of the above. Accordingly, such computer programs represent controllers of the computer system 800. Where the technology described herein is implemented, at least in part, using software, the software may be stored in a computer program product and loaded into computer system 800 using removable storage drive 814, interface 822, hard disk drive 812 or communications interface 834.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method for push service notification, the method comprising:
   determining, by a computing device, if a notification is to be sent to a particular user via a user device;
   determining, by the computing device, if the notification requires an action to be made by the particular user after the notification is received by the user;
   in response to determining the notification requires the action, choosing, by the computing device from multiple available communication channels, a communication channel with a lowest sum of (i) an average receive time duration and (ii) an average action time duration based on trend analysis of user history and channel history, wherein the average receive time duration is an average time duration taken to receive a push notification after the push notification has been sent, wherein the average action time duration is an average time duration taken for the user to take action after a notification is received; and
   sending, by the computing device, the notification via the chosen channel.

2. The method according to claim 1, wherein the trend analysis is performed based on prior notifications sent to the particular user.

3. The method according to claim 1, wherein the action comprises replying to the notification.

4. The method according to claim 1, wherein the action comprises a reply to the notification or a send command.

5. The method according to claim 1 further comprising recording the notification and the channel history.

6. The method according to claim 5, wherein the recording includes identifying receive time duration and action time duration for each notification.

7. The method according to claim 5, wherein the recording includes one or more of notification type, content, and action context.

8. One or more non-transitory computer-readable storage media storing processor-executable instructions that when executed cause one or more processors to perform operations that send notifications to users, comprising:
   initiating a push notification to a particular user;
   determining if the push notification requires an action to be made by the particular user after the notification is received by the user;
   if the push notification requires no action, choosing a communication channel among multiple available communications channels based on a lowest receive time duration as determined by trend analysis of prior user history and channel history over multiple communication channels, the choosing of the communication channel comprising choosing the communication channel with a lowest sum of (i) an average receive time duration and (ii) an average action time duration based on the user history; and
   sending the notification via the chosen channel.

9. The one or more non-transitory computer-readable storage media according to claim 8 wherein the operations further comprise recording the notification and the channel history of each of the users.

10. The one or more non-transitory computer-readable storage media according to claim 9, wherein the recording includes identifying receive time duration and action time duration for each notification.

11. The one or more non-transitory computer-readable storage media according to claim 9, wherein the recording includes one or more of notification type, content, and action context.

12. A system that facilitates push service notifications to users, the system comprising:
   a push center having a processor and memory that sends the service notifications to multiple users configured to connect to multiple communication channels,
   wherein:
      the push center determines which of multiple communication channels to send the service notifications based on trend analysis regarding user and channel history,
      the push center sends, in response to the service notifications requiring no action to be made by a user after the service notifications are received by the user, the service notifications to a communication channel with a lowest sum of (i) an average receive time duration and (ii) an average action time duration based on the user history as determined by the trend analysis.

13. The system according to claim 12, wherein the push center records and tracks the trend analysis of notifications sent to particular users over particular channels.

14. The system according to claim 12, wherein the push center records receive time duration and action time duration for each notification sent.

15. The system according to claim 12, wherein the push center determines if a notification requires an action by the user.

16. The system according to claim 12, wherein the multiple communication channels include one or more systems, networks, or devices.

17. The system according to claim 12, wherein the push center eliminates redundant notifications to the users.

* * * * *